United States Patent
Moeller et al.

(10) Patent No.: US 6,459,912 B1
(45) Date of Patent: Oct. 1, 2002

(54) MENU SYSTEM FOR A RADIOTRANSMISSION APPARATUS

(75) Inventors: Stephan Moeller, Hannover (DE); Hans Murgas, Koenigstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,478

(22) PCT Filed: Aug. 20, 1998

(86) PCT No.: PCT/DE98/02435

§ 371 (c)(1),
(2), (4) Date: Apr. 14, 2000

(87) PCT Pub. No.: WO99/17514

PCT Pub. Date: Apr. 8, 1999

(30) Foreign Application Priority Data

Sep. 29, 1997 (DE) .......................................... 197 42 851

(51) Int. Cl.[7] .................................................. H04B 1/38
(52) U.S. Cl. .................. 455/566; 455/550; 379/433.04; 345/810; 345/902
(58) Field of Search ................................ 455/566, 575, 455/550, 414, 462, 564; 345/428, 661, 676, 700, 764, 781, 810, 811, 819–820, 828, 902; 379/433.04, 433.01

(56) References Cited

U.S. PATENT DOCUMENTS

| | | |
|---|---|---|
| 5,386,460 A | 1/1995 | Boakes |
| 5,761,610 A | 6/1998 | Garton |
| 6,256,516 B1 * | 7/2001 | Wagner et al. ............... 455/566 |
| 6,285,364 B1 * | 9/2001 | Giordano, III et al. ...... 455/566 |

FOREIGN PATENT DOCUMENTS

| | | |
|---|---|---|
| EP | 0 365 200 A | 4/1990 |
| EP | 0 767 566 A | 4/1997 |
| EP | 0 844 553 A | 5/1998 |
| GB | 2 162 393 A | 1/1986 |

OTHER PUBLICATIONS

"Menu Method", Jun. 1, 1989, IBM Technical Disclosure, Bulletin, vol. 32, NR. 1, pp. 452–253.

* cited by examiner

Primary Examiner—Doris H. To
(74) Attorney, Agent, or Firm—Michael J. Striker

(57) ABSTRACT

A radio apparatus formed as a mobile or cordless telephone has a control screen, on which controls functions can be called upon and makes available which makes available the control functions of the radio apparatus for dialing and activation a display device on which a dial menu is shown as a function of a functional scope of a corresponding one of the operating modes; and a control unit providing at least a first and second operating mode the control unit being formed so that all control functions that can be called up in the first operating mode are also activatable in the second operating mode, the control unit being formed so that in the second operating mode, control functions that can not be called up in the first operating mode are additionally activatable, the control unit being also formed so that a third operating mode is provided in which all the control functions of the radio apparatus can be called up.

8 Claims, 1 Drawing Sheet

MENU SYSTEM FOR A RADIOTRANSMISSION APPARATUS

BACKGROUND OF THE INVENTION

The invention is based on a radio apparatus.

Radio apparatuses with control functions that can be called up on a control screen are already known.

SUMMARY OF THE INVENTION

It is an object of the present invention to provide a radio apparatus which avoids the disadvantages of the prior art.

In keeping with these objects, one feature of the present invention is that in a radio apparatus, at least a first and a second operating mode are provided, in each case a dialing menu can be shown on a display device as a function of the functional scope of the corresponding operational mode, all control functions that can be called up in the first operating mode are also activatable in the second operating mode, in the second operating mode, control functions that can not be called up in the first operating mode are additionally activatable, and an operating mode is provided in which all the control functions of the radio apparatus can be called up.

When the radio apparatus is designed in accordance with the present invention, it has the advantage over the prior art that its use is made easier for the user who does not require all the control functions of the radio apparatus. If he selects an operating mode with a limited scope of control functions, then he can access desired control functions within this control function scope faster, since time-consuming selection operations, for instance in a control menu, can be dispensed with. This also improves clarity for the user. By means of the various operating modes with their different scopes of control functions, the user of the radio apparatus can be adjusted individually to the demands of the particular user.

By the provisions recited in the dependent claims, advantageous refinements of and improvements to the radio apparatus defined by the main claim are possible.

It is especially advantageous that in the, first operating mode, control functions are activatable that enable basic telephone functions, in particular dialing a subscriber via a telephone network, taking incoming calls, and using a telephone book memory; and that in the second operating mode, in addition to the basic telephone functions, control functions can be activatable that enable enhanced telephone functions, in particular call forwarding and/or transmission and reception of data telegrams. In this way, the user has a choice between a basic scope of control functions for fundamental telephone functions and a further scope of control functions for the fundamental telephone functions and additional enhanced telephone functions. If the user does not need the enhanced telephone functions, then he could select the operating mode with the basic telephone functions and in this way save time in use, because fewer control functions, with greater clarity, are offered to him for selection.

Another advantage is that a third operating mode is provided, in which compared with the second operating mode, further control functions that go beyond pure telephone functions are additionally activatable, in particular pocket calculator, clock, alarm clock, Internet access or similar functions. In this way, the user is offered a further capability of differentiating between different functional scopes, so that the operating scope that can be selected can be adapted still better to the demands of the user, thus further enhancing clarity and ease of use for the user.

BRIEF DESCRIPTION OF THE DRAWING

One exemplary embodiment of the invention is shown in the drawing and described in further detail in the ensuing description.

DESCRIPTION OF THE PREFERRED EMBODIMENT

Figure 1:
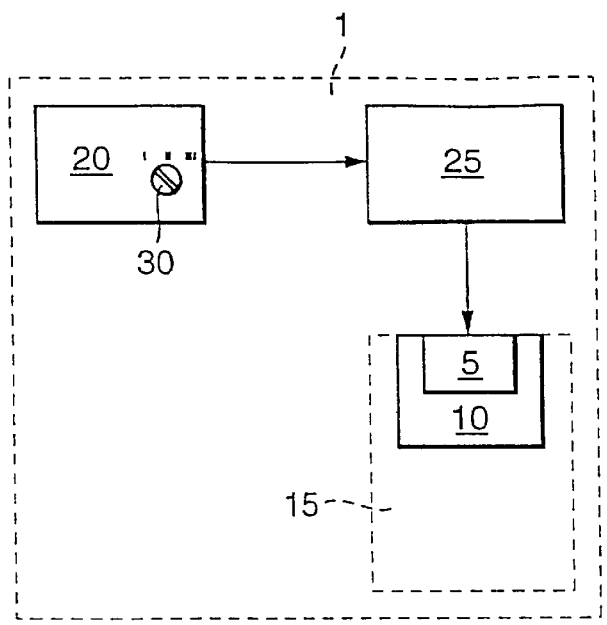
FIG. 1 is a block circuit diagram of a radio apparatus of the invention.

In FIG. 1, reference numeral 1 designates a radio apparatus, embodied for instance as a mobile or cordless telephone, which is shown in the form of a block circuit diagram containing the function blocks essential to the invention. The radio apparatus 1 includes an input unit 20 and an evaluation unit 25. Via the input unit 20, the user can cause the evaluation unit 25 to operate the radio apparatus 1 in one of three possible operating modes 5, 10, 15. To that end, at least one suitable control element 30 is provided on the input unit, for selecting among these three operating modes 5, 10, 15. This control element 30 can for instance be embodied as a rotary switch that can be switched among three positions I, II and III. However, the control element 30 can also be embodied as a pushbutton or key-type switch, by means of which the three different operating modes 5, 10, 15 can be selected depending on how long the control element 30 is actuated. It is also possible for each of the three operating modes 5, 10, 15 to be assigned its own control element on the input unit for selecting that operating mode. Other ways of embodying the at least one control element 30 can be left up to one skilled in the art. A third operating mode 15 is characterized in that in it, all the control functions of the radio apparatus 1 can be called up.

A second operating mode 10 is characterized in that in it, all the control functions that can also be called up in a first operating mode 5 can be called up. In addition, control functions that cannot be called up or activated in the first operating mode 5 are activatable in the second operating mode 10. Thus even in the second operating mode 10, all the control functions of the radio apparatus 1 can already be activatable, so that in that case the third operating mode 15 would no longer be necessary. This is suggested in FIG. 1 by showing the third operating mode 15 in dashed lines.

The first operating mode 5 can be an operating mode in which control functions can be activated that enable dialing a subscriber via a telephone network, taking incoming calls, and using a telephone book memory, not shown in FIG. 1. The first operating mode 5 would thus, make basic telephone functions for mobile or cordless telephoning available. In the second operating mode 10, then along with the control functions that can already be activated in the first operating mode 5, further control functions can additionally be activatable, which for instance enable call forwarding and/or the transmission and reception of data telegrams and that thus represent enhanced telephone functions. By choosing the first or the second operating mode 5, 10, the user can thus decide whether basic telephone functions, which in the first operating mode 5 he can choose and activate faster because of the limited control function scope, are sufficient for him, or whether along with the basic telephone a functions he does not wish to dispense with the enhanced telephone functions, so that he does need the second operating mode 10.

For the basic telephone functions, merely as examples the dialing of a subscriber via a telephone network, taking incoming calls, and using a telephone book memory can be named. Other basic telephone functions, such as speed dial, redial or the like, can also be included in the functional scope of the first operating mode 5.

Along with call forwarding and/or the transmission and reception of data telegrams, still other enhanced telephone functions, such as call waiting, conference calls or the like can also be realized.in the second operating mode 10.

The transmission and reception of data telegrams can involve so-called short messages in accordance with the short message service (SMS).

If the second operating mode 10 does not already include all the feasible control functions of the radio apparatus 1, then the user has the option, by choosing the third operating mode 15, of using the radio apparatus 1 universally, or .in other words with all the feasible control functions, for instance including pocket calculator, clock, alarm clock, Internet access, notebook or the like. The a functional scope of the radio apparatus 1 can thus be adapted to the demands of the user as a function of the operating mode 5, 10, 15 chosen, so that the user can always choose as fast as possible, and with maximum clarity, among the control functions that he needs.

Figure 2:
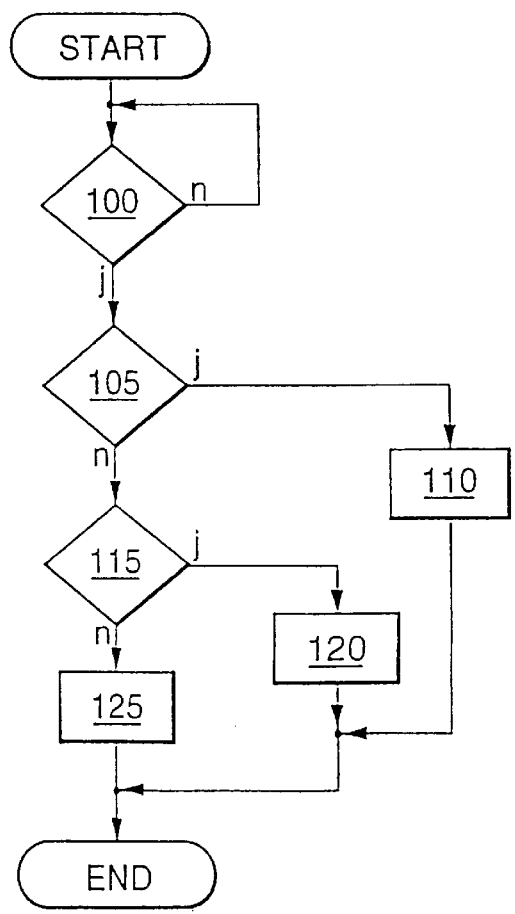
FIG. 2 is a flow chart for describing the mode of operation of an evaluation unit in the radio apparatus of the invention.

FIG. 2 shows a flow chart for the mode of operation of the evaluation unit 25. At a program point 100, the question is asked whether the control element 30 has been actuated. If so, a jump to program point 105 is made; if not, a return to program point 100 is made. In program point 105, the question is asked whether the third operating mode 15 has been selected by the control element 30, or in other words whether the control element 30 has been switched to position III. If so, a jump is made to program point 110; if not, a jump is made to program point 115. At program point 110; all the control functions of the radio. apparatus 1 are made available for selection and activation on the control screen of the radio apparatus 1; for example, a suitable selection menu, which depending on the functional scope can also include submenus that can be called up, can be displayed on a display device, not shown in FIG. 1, of the radio apparatus 1. That programpart is then exited out of. At program point 115, the question is asked whether the control element 30 has been put in position II. If so, a jump to program point 120 is made, and if not to program point 125. At program point 120, the user is offered a control menu on the display device not shown in FIG. 1; depending on the functional scope, this includes selectable submenus and makes a selection and activation of all the telephone functions, that is, both the basic telephone functions and the enhanced telephone functions, available to the user. Those control functions of the radio apparatus 1 that go beyond pure telephone functions, however, are not available for selection, examples being pocket calculator, clock, alarm clock, Internet access, notebook, or the like. These additional functions, which go beyond pure telephone applications, can be selected and activated only in the third no operating mode 15. After program point 120, this program part is exited out of. At program point 125, the user is offered a selection menu on the display device of the radio apparatus 1, not shown in FIG. 1, and in this menu he can select among various basic telephone functions, such as dialing a subscriber, taking an incoming call, using a telephone book memory, speed dialing, or the like for activation. Here the evaluation unit 25 has detected that the control element 30 has been put in position I, so that the first operating mode 5 has been selected, and no enhanced telephone functions such as call forwarding and/or transmission and reception of data telegrams are made possible. The enhanced telephone functions can be executed and activated only in the second operating mode 10 or the third operating mode 15. The program part is exited out of after program point 125.

What is claimed is:

1. A radio apparatus formed as a mobile or cordless telephone, comprising a control screen on which control functions can be called upon and which makes available the control functions of the radio apparatus for dialing and activation; a display device on which a dial menu is shown as a function of a functional scope of a corresponding one of a user-selectable operating mode, wherein each operating mode is defined by a predetermined set of said control functions, and wherein said radio apparatus can be switched between operating modes; and control means providing at least a first and second operating mode, said control means being formed so that all control functions that can be called up in the first operating mode are also activatable in the second operating mode, that in the second operating mode control functions that cannot be called up in the first operating mode are additionally activatable, and that a third operating mode is provided in which control functions that cannot be called up in the first and second operating modes are additionally activatable and in which all of the control functions of the first and second operating modes are also activatable, wherein the first operating mode comprises basic telephone functions, wherein the second operating mode comprises enhanced telephone functions, and wherein the third operating mode comprises further control functions other than the basic and enhanced telephone functions of the first and second operating modes.

2. A radio apparatus as defined in claim 1, wherein said control means are formed so that basic telephone functions enable dialing a subscriber via a telephone network, taking incoming calls and using a telephone book memory.

3. A radio apparatus as defined in claim 1, wherein said control means are formed so that the enhanced telephone functions enable a function selected from the group consisting of call forwarding, transmission and both reception of data telegrams.

4. A radio apparatus as defined in claim 1, wherein said control means are formed so that the second operating mode is the operating mode in which all the control functions of the radio apparatus are activatable.

5. A radio apparatus as defined in claim 1, wherein said control means are formed so that in the third operating mode, compared with the second operating mode, further control functions that go beyond pure telephone functions are additionally activatable.

6. A radio apparatus as defined in claim 5, wherein said control means are formed so that the further control means include a function selected from the group consisting of pocket calculator, clock, alarm clock, and Internet-access.

7. A radio apparatus as defined in claim 5, wherein said control means is formed so that in the third operating mode all the control functions of the radio apparatus are activatable.

8. A method of operating a radio apparatus formed as a mobile or cordless telephone, comprising the steps of calling up control functions on a control screen; making on the control screen the control functions on the radio apparatus available for dialing and activation; operating the radio apparatus in at least a first and a second operating mode; showing a dialing menu on a display device as a function of a functional scope of the corresponding operating mode; providing that all the control functions that can be called up in the first operating mode are also activatable in the second operating mode; additionally activating in the second operating mode control functions that can be called up in the first operating mode; providing a third operating mode in which all the control functions of the radio apparatus can be called up.

* * * * *